C. A. Woodbury,

Thread Cutter.

No. 79,093. Patented June 23. 1868.

Witnesses
W C Ashkettoz
Wm A Morgan

Inventor:
C. A. Woodbury
per Munn & Co.
Attys.

United States Patent Office.

C. A. WOODBURY, OF WOODSTOCK, VERMONT.

Letters Patent No. 79,093, dated June 23, 1868.

IMPROVEMENT IN THREAD-CUTTERS.

The Schedule referred to in these Letters Patent and making part of the same.

TO ALL WHOM IT MAY CONCERN:

Be it known that I, C. A. WOODBURY, of Woodstock, in the county of Windsor, and State of Vermont, have invented a new and improved Thread-Cutter; and I do hereby declare that the following is a full, clear, and exact description thereof, which will enable others skilled in the art to make and use the same, reference being had to the accompanying drawings, forming a part of this specification.

The object of my invention is to provide a simple and effective thread-cutter, that may be readily applied to and detached from a spool of thread, and which will readily cut the thread by a slight strain of the same being made over the cutter for the purpose, no matter from what portion of the spool it may be drawn.

It consists of a circular cutter of somewhat larger diameter than the spool, having a central hole, and provided with a shield of larger diameter than itself, having notches in the edge, forming rounded parts or teeth. Near the centre the shield is provided with springs projecting therefrom in an axial direction. The shield is attached to the cutter by inserting the springs in the eye of the cutter, and bending the pointed projections of the edge over the edge of the cutter, which, when so completed, is attached to the spool, and held thereto by inserting the springs in the axial hole of the spool.

In the drawings—

Similar letters of reference indicate corresponding parts.

Figure 1:
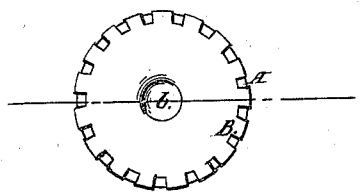
Figure 1 represents a side elevation of my improved thread-cutter.
Figure 2:
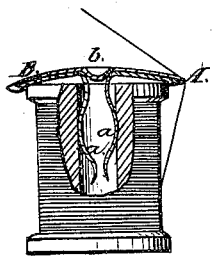
Figure 2 represents an edge view of the same, when applied to a spool, and a spool shown in red, with a part broken away.

A represents a circular cutter, which is preferably made of steel, with a sharp cutting-edge.

B represents a shield, provided with notches in the edge, and with the springs $a\ a$ projecting from one side of the same, near the centre, and which is attached to the cutter by passing the said springs through the central hole in the same, and bending the projections on the edge over the edge of the cutter. The said shield prevents the edge of the cutter from being dulled, also prevents cutting the hands while using it, and also serves to prevent the thread from slipping around loosely on the cutter while being drawn over it to cut off the thread. The tension of the thread on the shoulder prevents it from unwinding when drawn over the cutter for cutting it off. The cutter may be readily attached to any spool by inserting the springs in the central hole, and will be held there by the friction of the contact of the springs with the interior surface of the spool.

The shield is also provided with an indentation, $b$, in the outside, whereby the spool may be supported axially between the thumb and fingers, for unwinding the thread.

Having described my invention, I claim as new, and desire to secure by Letters Patent—

The thread-cutter, consisting of the disk A, having a sharp edge, the notched shield B, and springs $a$, substantially as herein set forth.

The above specification of my invention signed by me, this sixth day of April, 1868.

C. A. WOODBURY.

Witnesses:
   JAMES N. HASKELL,
   ALDEN P. CHURCHILL.